(12) United States Patent
Leinonen et al.

(10) Patent No.: US 7,026,265 B2
(45) Date of Patent: Apr. 11, 2006

(54) CATALYST COMPONENT COMPRISING MAGNESIUM, TITANIUM, A HALOGEN AND AN ELECTRON DONOR, ITS PREPARATION AND USE

(75) Inventors: Timo Leinonen, Tolkkinen (FI); Peter Denifl, Gries am Brenner (AT)

(73) Assignee: Borealis Technology Oy, Porvoo (FI)

( * ) Notice: Subject to any disclaimer, the term of this patent is extended or adjusted under 35 U.S.C. 154(b) by 29 days.

(21) Appl. No.: 10/415,838

(22) PCT Filed: Oct. 18, 2001

(86) PCT No.: PCT/EP01/12052

§ 371 (c)(1),
(2), (4) Date: Sep. 12, 2003

(87) PCT Pub. No.: WO02/38631

PCT Pub. Date: May 16, 2002

(65) Prior Publication Data

US 2004/0043892 A1    Mar. 4, 2004

(30) Foreign Application Priority Data

Nov. 10, 2000   (EP) .................... 00124671

(51) Int. Cl.
| | |
|---|---|
| B01J 31/00 | (2006.01) |
| B01J 37/00 | (2006.01) |
| C08F 4/02 | (2006.01) |
| C08F 4/60 | (2006.01) |
| C08F 4/44 | (2006.01) |

(52) U.S. Cl. .............. 502/125; 502/127; 502/128; 502/133; 502/134; 526/123.1; 526/124.3; 526/124.4; 526/125.7; 526/125.8

(58) Field of Classification Search ............... 502/125, 502/127, 128, 133, 134; 526/123.1, 124.3, 526/124.4, 125.7, 125.8
See application file for complete search history.

(56) References Cited

U.S. PATENT DOCUMENTS 5,424,379 A  *  6/1995  Kakugo et al. ............ 526/128

FOREIGN PATENT DOCUMENTS

| WO | WO 00/08073 | * | 2/2000 |
| WO | WO 00/68277 | * | 11/2000 |

OTHER PUBLICATIONS

International Search Report corresponding to International Application No. PCT/EP 01/12052.
International Preliminary Examination Report corresponding to International Application No. PCT/EP 01/12052.

* cited by examiner

Primary Examiner—J. A. Lorengo
Assistant Examiner—J. Pasterczyk
(74) Attorney, Agent, or Firm—Fay, Sharpe, Fagan, Minnich & McKee, LLP

(57) ABSTRACT

Process for the preparation of a particular olefin polymerisation catalyst component including magnesium dihalide, titanium tetrahalide and a carboxylic acid ester, in which the precursors of its constituents are reacted in solution from which the component is precipitated, this precipitation being accompanied by co-precipitation of one or more oligoesters of the carboxylic acid formed in a controlled manner.

37 Claims, No Drawings

CATALYST COMPONENT COMPRISING MAGNESIUM, TITANIUM, A HALOGEN AND AN ELECTRON DONOR, ITS PREPARATION AND USE

The invention relates to a process for the preparation of a particulate olefin polymerisation catalyst component comprising a magnesium dihalide, a titanium tetrahalide and a carboxylic acid ester. The invention also relates to such a catalyst component and its use for the polymerisation of olefins.

BACKGROUND OF THE INVENTION

The process for the preparation of a particulate olefin polymer catalyst component described in WO 00/08073 and 00/08074 includes a step in which a fraction of a magnesium dihalide-titanium tetrahalide-carboxylic acid ester complex is recovered by precipitation from solution. This precipitation is made by contacting the solution with a large amount of an aliphatic hydrocarbon. However, such precipitation leads to a tar-like reaction product of low catalytic activity, that needs to be washed several times in order to decrease the amount of inactive titanium complex. Such washing leads to a further decreased activity of the catalyst. Aromatic hydrocarbons have also been used for the precipitation, but they lead to a very finely divided precipitate which is difficult to deposit.

Moreover it is difficult to carry out such precipitations in a controlled and reproducible manner, leading to unsatisfactory product morphology, and to a variable and low concentration of butyl chloride in the product as a consequence of pre-precipitation evaporative removal of aliphatic solvent.

DESCRIPTION OF THE INVENTION

We have devised a new technique for effecting the precipitation of such a component, which leads to an improved product morphology and consistent product composition.

According to the present invention a process for preparing a particulate olefin polymerisation catalyst component comprising a magnesium dihalide, a titanium tetrahalide and carboxylic acid ester, comprises reacting, in solution in a $C_6$–$C_{10}$ aromatic solvent, a magnesium compound containing an alkoxy group, a carboxylic acid halide and a IV-valent titanium compound containing halogen to obtain a dissolved reaction product, said solution also containing a $C_2$–$C_{12}$ polyhydric alcohol and a reactive halogenated $C_1$–$C_{20}$ hydrocarbon; initiating formation of one or more oligoesters of said carboxylic acid with said alcohol by addition to said solution of a quantity of apolar solvent insufficient to cause precipitation of said reaction product, the oligoester formation being continued until the resultant change in composition of the liquid phase causes co-precipitation of said one or more oligoesters and said reaction product; and recovering, washing and drying the precipitate to obtain said catalyst component.

The reagents can be added to the aromatic solvent in any order. However a preferred embodiment of the invention is characterised in that in a first step the magnesium compound containing an alkoxy group is reacted with the carboxylic acid halide and in a second step the obtained product is further reacted with the four-valent titanium compound containing a halogen. The magnesium compound preferably contains from 1 to 20 cations per alkoxy group, and the carboxylic acid should contains at least 8 carbon atoms.

The apolar solvent is advantageously a $C_5$ to $C_{15}$-aliphatic compound, particularly a paraffin, n-heptane being specially preferred. The quantity of apolar solvent added to initiate formation, and co-precipitation of the oligoesters with the reaction product, may be from 1 to 10 mol % of the quantity of the solvent in which the reacting was carried out, and will usually be within the range 2 to 5 mol % thereof. However the necessary amount cannot be expressed absolutely, since its effect is partly dependent upon the concentration, in the solution to which it is added, of the precursors of the oligoesters which are formed. If too much of the apolar solvent is added precipitation of the reaction product will occur prematurely, and the advantages of the inventive process will not be realised.

The apolar solvent may advantageously be added in the form of a mixture with an aromatic solvent such as employed in forming the reactant solution, particularly toluene. Suitable proportioning of such a mixture is provided by a 10 to 50 vol %, preferably 20 to 40%, complement of the apolar solvent. Use of such a mixture, rather than straight apolar solvent, avoids the build-up of local concentrations of the apolar solvent high enough to cause premature precipitation.

Reaction of the magnesium compound, acid halide polyhydric alcohol and halogenated hydrocarbon proceeds satisfactorily at temperatures in the range 20 to 80° C., preferably 50 to 70° C. The product of that reaction, referred to sometimes herein as the "Mg complex", is advantageously reacted with the IV-valent titanium compound at a slightly higher temperature, say 75 to 85° C., which is the temperature of the reactant solution at the time the apolar solvent is added to it.

It can be beneficial, although it is not essential, for the temperature of the reactant solution to be raised further, suitably to a temperature in the range 85–110° C., particularly 85–95° C., immediately after addition of the apolar solvent, during formation of the oligoester. This may accelerate oligoester formation, and eventual precipitation. However this further temperature raising may be delayed until the onset of precipitation, at which time it is advantageously accompanied by agitation for a period of at least 0.25 hr, or until that precipitation has been completed.

The use of relatively low temperatures during formation of the oligoester conduces to better product morphology, in particular higher catalyst bulk density, whilst the use of relatively nigh temperature conduces to higher catalyst activity.

A significant advantage of the inventive process results from its use of an aromatic solvent for the reaction of the magnesium compound. In consequence the requirement for a solvent-removing evaporation step—essential when heptane was used as solvent in the prior process—is dispensed with, and the loss of reactive halogenated hydrocarbon (such as butyl chloride) which inevitably occurred during such evaporation is completely obviated. The consequent controllable higher concentration of this reactive component in the solution in which the Mg complex is formed, or in the Mg complex itself, leads to consistent morphology and to higher product bulk density. Catalyst bulk density and morphology correlate with product bulk density and morphology—the so-called "replication effect".

Moreover the technique of precipitation adopted in the novel regimen of the invention is inherently more precise than that formerly employed, and thus further contributes to product consistency, as well as sharply reducing the volumes of solvent to be handled and thus improving process economics.

Still further, the process of the invention for the first time applies a measure of control to the production of oligoester components. These components lead, as is known, to a diminution of ultimate catalyst activity. On the other hand, they have a beneficial effect on catalyst morphology, and a balance must be struck between these oppositely-directed consequences of their presence. According to the invention, in which their production is effected under precise control, such a balance is deliberately achievable.

The aromatic hydrocarbon used as solvent in the reaction is preferably selected from substituted and unsubstituted benzenes, preferably from alkylated benzenes, more preferably from toluene and the xylenes, and is most preferably toluene.

According to a preferred embodiment of the invention, the recovered fraction of the reaction product which has been obtained in particulate form is washed at least once, preferably at least twice, most preferably at least three times with a hydrocarbon, which preferably is selected from aromatic and aliphatic hydrocarbons.

It is preferable if said recovered catalyst component is washed with toluene, preferably with hot (e.g. 90° C.) toluene. It is further preferable if said recovered catalyst component is washed with heptane, most preferably with hot (e.g. 90° C.) heptane. Yet further, it is preferable if said recovered catalyst component is washed with pentane. A washing step typically includes several substeps. Such a washing sequence is, for example, one wash with toluene at 90° C., two washes with heptane at 90° C. and one or two washes with pentane at room temperature.

The washing can according to the invention be optimised to give a catalyst with novel and desirable properties. Finally, the washed catalyst component is dried, preferably by evaporation.

The molar ratio of said aromatic solvent to magnesium is preferably less than 10. According to an embodiment of the invention, the molar ratio of said solvent to magnesium is from 4 to 10, preferably from 5 to 9 and most preferably from 6 to 8.

It is preferable if the intermediates as well as the final product of the claimed process are distinct compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules, —unlike compounds of first order, in the creation of which atoms participate".

The magnesium compound containing an alkoxy group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesiums, alkyl magnesium alkoxides, alkyl magnesium halides and magnesium dihalides. It can further be selected from the group consisting of dialkyloxy magresiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$, wherein each one of the two Rs is a similar or different $C_1$–$C_{20}$ alkyl, preferably a similar or different $C_4$–$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide, octyl magnesium butoxide and octyl magnesium octoxide.

Dialkyl magnesium, alkyl magnesium alkoxide or magnesium dihalide can react with a polyhydric alcohol $R'(OH)_m$ or a mixture thereof with a monohydric alcohol R'OH. The use of a polyhydric alcohol $R'(OH)_m$ improves the morphology of the catalyst component compared to the use of a monohydric alcohol alone.

Typical $C_2$ to $C_{12}$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, trimethylol propane and pentareythritol. The polyhydric alcohol can be selected on the basis of the activity and morphology it gives the catalyst component. E.g. larger particle size and broader particle size distribution can be obtained by using ethylene glycol.

The reaction solution may also contain a monohydric alcohol, which may be straight or branched-chain. Typical $C_1$–$C_{20}$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt. amyl alcohol, sec. isoamyl alcohol, tert.butyl carbinol. Typical $C_6$–$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical>$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a $C_2$–$C_{16}$ alkyl group, most preferably a $C_4$–$C_{12}$ alkyl group, like 2-ethyl-1-hexanol.

Preferably, essentially all of the carboxylic acid ester is a reaction product of the above mentioned carboxylic acid halide. The carboxylic acid halide is preferably a dicarboxylic acid dihalide, more preferably an unsaturated α,β-dicarboxylic acid dihalide, most preferably phthalic acid dichloride.

According to yet another embodiment of the invention, the four-valent titanium compound containing a halogen is a titanium tetrahalide $TiX''_4$, wherein X" is a halogen. Equivalent with said titanium tetrahalide is the combination of an alkoxy titanium halide and a halogenation agent thereof, which are able to form a titanium tetrahalide in situ. However, the most preferred titanium tetrahalide is titanium tetrachloride.

The reaction conditions used in the claimed process may be varied according to the used reactants and agents.

In the invention, it was further found that the addition of at least one halogenated hydrocarbon during the process led to a further improved catalytic activity.

The reactive halogenated hydrocarbon preferably has the formula $R'''X'''_n$ wherein R''' is an n-valent $C_1$–$C_{20}$ hydrocarbyl group, particularly a $C_1$–$C_{10}$ paraffin, X''' is a halogen and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2) tetrachloroethane, pentachloroethane, hexachloroethane, (1)-chloropropane, (2)-chloropropane, (1,2)-dichloropropane, (1,3)-dichloropropane, (1,2,3)-trichloropropane, (1)-chlorobutane, (2)-chlorobutane, isobutyl chloride, tert.butyl chloride, (1,4)-dichlorobutane, (1)-chloropentane, (1,5)-dichloropentane. The chlorinated hydrocarbons of the invention may also be unsaturated, provided that the unsaturation does not act as catalyst poison in the final catalyst component.

In said halogenated hydrocarbon having the above formula, R''' is preferably a mono-or bivalent $C_1$–$C_{10}$ alkyl group, independently, X''' is preferably chlorine and, independently, n is preferably 1 or 2. Preferably said halogenated hydrocarbyl is a butyl chloride (BuCl) or a dichloroalkane like (1,4)-dichlorobutane, more preferably tertiary butyl chloride or a dichloroalkane like (1,4)-dichlorobutane, most preferably a dichloroalkane like (1,4)-dichlorobutane.

Some preferred embodiments of the invention are described, by way of illustration, in the following Examples.

EXAMPLE 1

In a glass reactor 3,10 ml of ethylene glycol and 8,80 g of 2-butyl-2ethyl-1,3-propanediol were added to 69,5 ml of 2-ethyl hexanol. The reaction mixture was then heated to 50° C. and stirred until a clear solution was obtained. After cooling to 10–15° C., 216,0 ml of a 20% butyloctyl magnesium (BOMAG) solution in toluene was added slowly to the alcohol mixture within a period of about 60 minutes. During the addition of the Mg-alkyl the temperature of the reaction mixture was kept below 20° C. The temperature was then increased to 60° C. and the reactants were allowed to react for 30 minutes.

After addition of 15,8 ml of 1,2-phthaloyl dichloride during a period of 15 minutes, the reaction mixture was stirred at 60° C. for 90 minutes. Finally, 50,2 ml of n-butyl chloride was added and stirring of the solution at 60° C. was continued for another 15 minutes to ensure complete reaction.

After cooling to room temperature a yellow solution was obtained, which could be stored under inert gas for several months without any indication of decomposition.

19,5 ml (0,175 mol) titanium tetrachloride were placed in a 250 ml synthesis glass reactor equipped with a mechanical stirrer. After heating the reactor to 80° C., about 35–36 g (the amount containing 25,0 mmol Mg) of the Mg-complex was added to the well-stirred $TiCl_4$ within 1 minute via a syringe. The mixture was then stirred for 5 minutes at 80° C. After addition of 6 ml of a toluene/n-heptane mixture (70/30=Volume/Volume) using a syringe, a clear dark red solution was obtained. The temperature of this solution was then increased from 80° C. to 90° C. over a period of 7 to 8 minutes, and stirring of the reaction mixture at that higher temperature was continued for additional 30 minutes.

After separating the liquid from the precipitated catalyst by siphoning, the obtained crude product was stirred at 90° C. for 30 minutes with 100 ml of toluene (toluene is preheated to 90° C. before addition), followed by removing of the washing toluene by siphoning. In the same way was the catalyst then washed two times with 60 ml n-heptane at 90° C. (20 minutes stirring) and two times with n-pentane at room temperature (10 min stirring).

Finally the precipitate was dried at 60° C. by purging nitrogen through the reactor, yielding about 3 g of the desired catalyst component in form of a yellow, air sensitive powder. Its bulk density was 0.61 g/ml.

Preparation of an olefin polymerisation catalyst including the obtained component was carried out as follows.

About 0.9 ml triethyl aluminium (TEA) (co-catalyst), ca 0.12 ml cyclohexyl methyl dimethoxy silane (CMMS) as an external donor and 30 ml n-pentane were mixed and allowed to react for 5 minutes. Half of the mixture was then added to a polymerisation reactor and the other half was mixed with about 20 mg of the Mg component. After an additional 5 minutes the catalyst/TEA/donor/n-pentane mixture was added to the reactor. The Al/Ti mole ratio was 250 mol/mol and the Al/CMMS mole ratio was 10 mol/mol.

Propylene standard bulk polymerisation was carried out in a stirred 5l tank reactor.

70 mmol hydrogen and 1400 g propylene were introduced into the reactor and the temperature was raised within ca 15 minutes to the polymerisation temperature of 70° C. The polymerisation time at 70° C. was 60 minutes, after which the polymer formed was taken out from the reactor.

EXAMPLES 2–8

Seven repetitions of Example 1 were performed, in order to determine the reproducibility of product properties.

EXAMPLE 9

Example 1 was repeated, except that the Mg-complex was added to the $TiCl_4$ at 70° C., and stirred at that temperature for 5 minutes before the reaction mixture was heated to 90° C. The bulk density of the resulting catalyst component was 0.48 g/ml.

EXAMPLE 10

Example 1 was repeated, except that the Mg-complex was added to the $TiCl_4$ at 60° C., and stirred at that temperature for 5 minutes before the reaction mixture was heated to 90° C. The bulk density of the resulting catalyst component was 0.37 g/ml.

EXAMPLE 11

Example 1 was repeated, except that the Mg-complex was added to the $TiCl_4$ at 80° C., and stirred at that temperature for 5 minutes before the reaction mixture was heated to 105° C.

EXAMPLE 12

Example 1 was repeated, except that the Mg-complex was added to the $TiCl_4$ at 20° C., and stirred at that temperature for 5 minutes before the reaction mixture was heated to 90° C.

The composition, and properties in olefin polymerisation, of the catalysts of Examples 1 to 12 are set forth in Table 1 below.

TABLE 1

| | CATALYST | | | POLYMERISATION RESULTS AND POLYMER PROPERTIES | | | | |
|---|---|---|---|---|---|---|---|---|
| | Ti [w-%] | Mg [w-%] | DOP[1] [w-%] | Activity[2] [kg/g] | BD[3] [g/ml] | Fines[4] [w %] | XS[5] [w %] | MFR$_2$[6] [g/10 min] |
| Example 1 | 4.1 | 13.0 | 17.8 | 25.1 | 0.46 | 0.4 | 2.7 | 5.0 |
| Example 2 | 4.1 | 12.9 | 17.4 | 25.8 | 0.44 | 1.5 | 2.5 | 5.3 |
| Example 3 | 3.8 | 13.3 | 18.8 | 25.4 | 0.44 | 0.9 | 2.5 | 5.5 |
| Example 4 | 4.1 | 12.8 | 18.7 | 24.9 | 0.43 | 0.4 | 2.6 | 4.7 |
| Example 5 | 3.9 | 12.2 | 19.6 | 26.2 | 0.41 | 0.3 | 2.8 | 5.4 |
| Example 6 | 4.2 | 13.4 | 18.9 | 25.5 | 0.45 | 0.1 | 2.8 | 5.2 |
| Example 7 | 4.3 | 13.3 | 17.8 | 26.4 | 0.43 | 1.1 | 2.6 | 5.3 |
| Example 8 | 4.1 | 12.4 | 18.5 | 26 | 0.41 | 0.4 | 2.9 | 5.8 |
| Average Value (Ex 1–8) | 4.1 | 12.9 | 18.4 | 25.7 | 0.43 | 0.6 | 2.7 | 5.3 |
| Standard deviation. | 0.16 | 0.44 | 0.72 | 0.53 | 0.02 | 0.48 | 0.15 | 0.33 |
| Example 9 | 4.3 | 14.7 | 21.4 | 24.1 | 0.38 | 0.60 | 2.6 | 4.8 |
| Example 10 | 3.6 | 15.4 | 21.5 | nd[7] | nd | nd | nd | nd |
| Example 11 | 3.4 | 9.9 | 19.4 | 5.3 | 0.26 | 4.6 | 2.1 | 5.2 |
| Example 12 | 4.0 | 13.1 | 17.0 | 21.0 | 0.41 | 1.2 | 2.5 | 7.1 |

[1]DOP = dioctyl phthalate.
[2]kg of polymer product per g of total catalyst.
[3]BD = bulk density according to ASTM D 1895.
[4]Fines = polymer particles of <0.1 mm particle size.
[5]XS = xylene solubles at room temperature, a measure of product isotacticity.
[6]Product Melt Flow Rate determined according to ISO 1133 at 2.16 kg load, and 230° C..
[7]nd = not determined

COMPARATIVE EXAMPLES 1–8

In a glass reactor 3,10 ml of ethylene glycol and 8,80 g of 2-butyl-2ethyl-1,3-propanediol were added to 69,5 ml of 2-ethyl hexanol. The reaction mixture was then heated to 50° C. and stirred until a clear solution was obtained. After cooling to 10–15° C., 250,0 ml of a 20% BOMAG A solution in heptane was added slowly to the alcohol mixture within about 60 minutes. During the addition of the Mg-alkyl the temperature of the reaction mixture was kept below 20° C. The temperature was then increased to 60° C. and the reactants were allowed to react for 30 minutes.

After addition of 15,8 ml of 1,2-phthaloyl dichloride during a period of 15 minutes, the reaction mixture was stirred at 60° C. for 30 minutes. Finally, 25,1 ml of n-butyl chloride was added and stirring of the solution at 60° C. was continued for another 20 minutes to ensure complete reaction. The n-heptane, coming from the Mg-alkyl solution, together with unreacted butyl chloride, was then removed in vacuum at 107° C.

After cooling to room temperature 116 ml of toluene was added. The resulting Mg-was in the form of a yellow, air sensitive solution which could be stored under inert gas for several months without any indication of decomposition.

18,7 ml titanium tetrachloride were placed in a 250 ml synthesis glass reactor equipped with a mechanical stirrer. After heating the reactor to 110° C., 21,5 g of the Mg-complex was added to the well-stirred TiCl$_4$ within 1 minute via a syringe. The mixture was then stirred for 5 minutes at 110° C. After cooling to 90° C., 100 ml of a toluene/n-heptane mixture (70/30=Volume/Volume) were added, resulting in substantial immediate precipitation, creating a dark red suspension. Stirring of this reaction mixture was then continued for another 30 minutes at 90° C.

The so formed precipitate was then allowed to settle, and after separating the clear solution from the precipitated catalyst by siphoning, the obtained crude product was washed first at 90° C. for 30 minutes with 150 ml of toluene (toluene was pre-heated to 90° C. before addition), then twice with 150 ml of n-heptane at 90° C. (20 minutes stirring) and two times with 150 ml of n-pentane at room temperature (10 minutes stirring). Finally the catalyst powder was dried at 60° C. by purging nitrogen through the reactor, yielding about 3 g of the desired catalyst component in form of a yellow, air sensitive powder.

The obtained Mg component was used to prepare an olefin polymerisation catalyst, and tested for propylene polymerisation, exactly as was described in Example 1. Also as in that Example, seven repetitions were performed by way of investigation of reproducibility. The result are set forth in Table 2 below.

TABLE 2

Comparative Examples

| | CATALYST | | | POLYMERISATION RESULTS AND POLYMER PROPERTIES | | | | |
|---|---|---|---|---|---|---|---|---|
| | Ti [w-%] | Mg [w-%] | DOP [w-%] | Activity [kg/g] | BD [g/ml] | Fines w % | XS [w %] | MFR$_2$ [g/10 min] |
| Example 1 | 4.2 | 15.1 | 19.1 | 22 | 0.29 | 0.1 | 2.9 | 5.1 |
| Example 2 | 4.4 | 15.2 | 20.5 | 24.1 | 0.3 | 0.3 | 2.7 | 5.2 |

TABLE 2-continued

Comparative Examples

| | CATALYST | | | POLYMERISATION RESULTS AND POLYMER PROPERTIES | | | | |
|---|---|---|---|---|---|---|---|---|
| | Ti [w-%] | Mg [w-%] | DOP [w-%] | Activity [kg/g] | BD [g/ml] | Fines w % | XS [w %] | MFR$_2$ [g/10 min] |
| Example 3 | 4.2 | 14.3 | 20.01 | 24.4 | 0.22 | 4 | 2.7 | 5.5 |
| Example 4 | 3.9 | 13.8 | 20.65 | 24.3 | 0.26 | 1.3 | 2.5 | 5.1 |
| Example 5 | 4.5 | 13.3 | 20.17 | 28 | 0.23 | 2.1 | 2.5 | 5.3 |
| Example 6 | 3.7 | 13.5 | 21.74 | 21.5 | 0.45 | 4.1 | 2.3 | 4.9 |
| Example 7 | 4 | 14.3 | 20.62 | 27 | 0.35 | 0.1 | 2.4 | 4.9 |
| Example 8 | 3.9 | 13.8 | 19.4 | 24.2 | 0.3 | 0.4 | 2.6 | 5 |
| Average Value | 4.1 | 14.2 | 20.3 | 24.4 | 0.30 | 1.6 | 2.6 | 5.1 |
| Standard Deviation | 0.27 | 0.70 | 0.82 | 2.20 | 0.07 | 1.69 | 0.19 | 0.21 |

It will be observed that, except in the case of MFR, the standard deviations for the comparative catalysts are significantly larger than those reported in Table 1. The differences are significant in both polymer morphology parameters (bulk density and fines content), and particularly marked in the vital parameter catalyst activity.

The invention claimed is:

1. A process for the preparation of a particulate olefin polymerisation catalyst component comprising a magnesium dihalide, a titanium tetrahalide and carboxylic acid ester, comprising the steps:

i) providing a magnesium compound continuing at least one alkoxy group;

ii) reacting said magnesium compound in a solution of a $C_6$–$C_{10}$ aromatic solvent, with a halide of a carboxylic acid and a tetravalent titanium compound containing halogen to obtain a dissolved reaction product wherein the solution also contains a $C_2$–$C_{12}$ polyhydric alcohol and a reactive halogenated $C_1$–$C_{20}$ hydrocarbon;

iii) initiating in said solution the formation of one or more oligoesters of said carboxylic acid with said polyhydric alcohol by adding a quantity of an apolar solvent insufficient to cause precipitation of the reaction product of ii);

iv) continuing the oligoester formation until the resultant change in the composition of the solution phase causes co-precipitation of said one or more oligoesters and of said reaction product; and v) recovering washing and drying the co-precipitate to obtain said catalyst component.

2. A process according to claim 1 wherein the magnesium compound contains 1 to 20 carbon atoms per alkoxy group and said carboxylic acid is a dicarboxylic acid and contains at least 8 carbon atoms.

3. A process according to claim 1 wherein the quantity of said added apolar solvent is from 1 to 10 mol % of the solvent present in the solution.

4. A process according to claim 1 wherein the quantity of the added apolar solvent is from 2 to 5 mol % of the solvent present in the solution.

5. A process according to claim 1 wherein said apolar solvent comprises a $C_5$ to $C_{15}$ aliphatic compound.

6. A process according to claim 5 wherein said apolar solvent is added in admixture with a $C_6$ to $C_{10}$ aromatic compound.

7. A process according to claim 6 wherein said apolar solvent constitutes 10 to 50 vol % of said admixture.

8. A process according to claim 6 wherein said apolar solvent constitutes 20 to 40 vol % of said admixture.

9. A process according to claim 1 wherein after the addition of said apolar solvent said solution is heated to a higher temperature at which it is maintained with agitation.

10. A process according to claim 1 wherein said tetravalent titanium compound is added to said solution in a $C_6$ to $C_{10}$ aromatic solvent after the magnesium compound, acid halide, polyhydric alcohol and halogenated hydrocarbon therein have reacted.

11. A process according to claim 10 wherein the reaction of magnesium compound, acid halide, polyhydric alcohol and halogenated hydrocarbon is carried out at a temperature of 20 to 80° C.

12. A process according to claim 10 wherein said tetravalent titanium compound is reacted with the reaction product of said magnesium compound, acid halide, polyhydric alcohol and halogenated hydrocarbon at a temperature higher than that at which those reagents were reacted.

13. A process according to claim 12 wherein said tetravalent titanium compound is reacted at a temperature of 75 to 85° C.

14. A process according to claim 1 wherein during oligoester formation the temperature of said solution phase is higher than the temperature at which the tetravalent titanium compound reacted.

15. A process according to claim 14 wherein the temperature of said solution phase is 85 to 110° C.

16. A process according to claim 15 wherein the solution phase is maintained at said temperature for at least 0.25 hr with agitation.

17. A process according to claim 1 wherein the washing is with toluene, n-heptane and/or n-pentane.

18. A process according to claim 1 wherein said aromatic solvent is benzene, toluene or xylene.

19. A process according to claim 1 wherein each alkyl group in said magnesium compound has 2 to 12 carbon atoms.

20. A process according to claim 19 wherein each said alkyl group has 4 to 10 carbon atoms.

21. A process according to claim 1 wherein said carboxylic acid halide is a dicarboxylic acid dihalide.

22. A process according to claim 21 wherein said dicarboxylic acid halide is α, β-unsaturated.

23. A process according to claim 1 wherein said tetravalent titanium compound is a titanium tetrahalide.

24. A process according to claim 1 wherein said polyhydric alcohol is a straight- or branched-chain aliphatic diol.

25. A process according to claim 24 wherein said solution in a $C_6$–$C_{10}$ aromatic solvent further comprises a monohydric alcohol and/or a triol.

26. A process according to claim 25 wherein the monohydric alcohol is a $C_1$–$C_{20}$ straight- or branched-chain aliphatic alcohol.

27. A process according to claim 1 wherein said reactive halogenated hydrocarbon is a $C_1$–$C_{10}$ paraffin having 1 to 4 halogen atoms per molecule.

28. A process according to claim 10 wherein the reaction of magnesium compound, acid halide, polyhydric alcohol and halogenated hydrocarbon is carried out at a temperature of 50 to 70° C.

29. A process according to claim 1 wherein until the precipitation the molar ratio of solvent to magnesium is maintained at a value with the range 4 to 10.

30. A process according to claim 1 wherein in said solution in which reaction occurs the molar ratio of magnesium to carboxylic acid halide is from 1 to 10.

31. A process according to claim 1 wherein in said solution in which reaction occurs the molar ratio of magnesium to polyhydric alcohol is from 1 to 4.

32. A process according to claim 25 wherein in said solution in which reaction occurs the molar ratio of magnesium to monohydric alcohol is from 0.2 to 1.

33. A process according to claim 1 wherein in said solution in which reaction occurs the molar ratio of magnesium to said reactive halogenated hydrocarbon is from 0.05 to 5.

34. A process according to claim 1 wherein in said solution in which reaction occurs the molar ratio of magnesium to titanium compound is from 0.01 to 1.

35. A process according to claim 1 wherein said recovered catalyst component comprises a titanium tetrahalide, a magnesium dihalide and a carboxylic acid ester in the molar proportions 1:(8 to 10):(0.7 to 1.3).

36. An olefin polymerization catalyst comprising a catalyst component prepared according to claim 1 and an alkyl aluminum co-catalyst.

37. An olefin polymerization process comprising polymerizing $C_2$–$C_{10}$ alpha olefins in the presence of the catalyst of claim 36.

* * * * *